US011405087B1

(12) United States Patent
Marupaduga (10) Patent No.: US 11,405,087 B1
(45) Date of Patent: Aug. 2, 2022

(54) SYSTEMS AND METHODS FOR DYNAMICALLY ADJUSTING REPORTING PERIODICITY

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 32 days.

(21) Appl. No.: 16/883,150

(22) Filed: May 26, 2020

(51) Int. Cl.
*H04W 24/10* (2009.01)
*H04B 7/06* (2006.01)
*H04L 5/00* (2006.01)
*H04L 1/00* (2006.01)
*H04L 27/00* (2006.01)
*H04W 64/00* (2009.01)

(52) U.S. Cl.
CPC ......... *H04B 7/0626* (2013.01); *H04L 1/0026* (2013.01); *H04L 5/0057* (2013.01); *H04L 5/0069* (2013.01); *H04L 27/0008* (2013.01); *H04W 24/10* (2013.01); *H04L 1/0003* (2013.01); *H04W 64/003* (2013.01)

(58) Field of Classification Search
CPC ... H04W 24/10; H04W 48/00; H04W 72/042; H04W 72/0453; H04W 72/085; H04W 16/10; H04L 5/0048; H04L 5/0057; H04L 5/0026; H04L 27/0008; H04L 1/0003; H04B 7/0626; H04B 7/0628; H04B 7/0695; H04B 7/088; H04B 7/063
See application file for complete search history.

(56) References Cited

U.S. PATENT DOCUMENTS

| | | | |
|---|---|---|---|
| 10,064,166 B1* | 8/2018 | Liu | H04W 28/0205 |
| 10,321,334 B1* | 6/2019 | Marupaduga | H04W 16/30 |
| 11,140,695 B1* | 10/2021 | Eyuboglu | H04W 56/009 |
| 2012/0195213 A1* | 8/2012 | Tan | H04L 5/0057 370/252 |
| 2013/0194931 A1* | 8/2013 | Lee | H04W 72/04 370/241 |
| 2015/0043450 A1* | 2/2015 | Ariyavisitakul | H04W 24/10 370/329 |
| 2015/0282191 A1* | 10/2015 | Luo | H04L 1/0026 455/452.1 |
| 2016/0270091 A1* | 9/2016 | Frenne | H04W 72/042 |
| 2017/0331645 A1* | 11/2017 | Baugh | H04L 5/0051 |
| 2018/0183556 A1* | 6/2018 | Shin | H04L 5/0051 |
| 2018/0227728 A1* | 8/2018 | Kim | H04B 7/063 |
| 2018/0234136 A1* | 8/2018 | Marinier | H04B 7/0626 |
| 2019/0116594 A1* | 4/2019 | Kwak | H04L 5/0044 |

(Continued)

*Primary Examiner* — Jean A Gelin (57) ABSTRACT

Systems and methods are provided for dynamically changing channel state information (CSI) reporting periodicity for a wireless device communicating with an access node within a wireless network. The methods and systems identify a wireless device in an undesirable location based on an antenna a sector power ratio of an antenna deployed by the access node within the wireless network. Further, the method determines an existing CSI reporting frequency for the wireless device reporting to the access node and dynamically, in response to the determination, changes the CSI reporting frequency for the wireless device to enable more frequent CSI reporting to the access node.

20 Claims, 8 Drawing Sheets

(56) References Cited

U.S. PATENT DOCUMENTS

| | | | |
|---|---|---|---|
| 2019/0222283 A1* | 7/2019 | Yum | H04W 72/0413 |
| 2019/0364546 A1* | 11/2019 | Kwak | H04L 5/0044 |
| 2020/0099473 A1* | 3/2020 | Han | H04B 7/0626 |
| 2020/0162134 A1* | 5/2020 | Kakishima | H04L 5/00 |
| 2020/0245166 A1* | 7/2020 | Kwak | H04B 17/318 |
| 2020/0304257 A1* | 9/2020 | Kim | H04W 72/048 |
| 2021/0062625 A1* | 3/2021 | Hale | E21B 34/00 |
| 2021/0092625 A1* | 3/2021 | Wang | H04L 41/0677 |
| 2021/0126753 A1* | 4/2021 | Mochizuki | H04L 5/0037 |
| 2021/0298038 A1* | 9/2021 | Kang | H04W 72/1268 |
| 2021/0329482 A1* | 10/2021 | Yoon | H04W 74/08 |
| 2021/0329674 A1* | 10/2021 | Matsumura | H04B 7/022 |
| 2021/0337552 A1* | 10/2021 | Taherzadeh Boroujeni | H04B 7/0626 |

* cited by examiner

SYSTEMS AND METHODS FOR DYNAMICALLY ADJUSTING REPORTING PERIODICITY

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies such as 4G are often used in combination with newer technologies such as 5GNR.

Wireless devices closer to a 5G antenna are more likely to receive the benefits of the 5G technology. Access to high data speeds is improved if a high signal to interference and noise ratio (SINR) is present. Further, antenna parameters such as the Sector Power Ratio (SPR) impact efficiency. The lower the ratio, the better the performance of the antenna. While a high performing antenna might have an SPR of three to four percent, a typical antenna may have an SPR of eight percent. Lower performing antennas would have an even higher SPR.

Accordingly, when a wireless device moves further from an antenna having a high sector power ratio, the wireless device is likely to experience a decrease in quality of service (QOS). In order to avoid prolonged decreases in QOS or other performance parameters, wireless devices periodically send channel status information (CSI) reports to an access node in the network. The CSI report tells the access node how good or bad a channel is at a specific time. The CSI report may contain for example, a channel quality indicator (CQI), a precoding matrix index (PMI), and a rank indicator (RI), CSI-RS Resource Indicator (CRI), SS/PBCH Resource Block Indicator (SSBRI), and layer indicator (LI) as well as other measurements. Often, the wireless devices report in a periodic time interval configured by a higher layer.

In response to CSI reports, a network entity can attempt to properly perform modulation coding scheme (MCS) assignment and allocate and schedule resources for each of the wireless devices to positively impact performance. The network entity considers the number of number of resource blocks and MCS for each CQI value to properly allocate the resources for each of the wireless devices.

Because wireless devices that are further from a sector antenna and devices utilizing an antenna with undesirable antenna parameters often suffer from reduced performance, these devices may have a need for increased frequency of reporting to the network entity in order to benefit from resource reallocation. Accordingly, a system is needed that will dynamically increase reporting frequency for adversely impacted wireless devices. Further, there is a need for systems and methods that can improve overall resource utilization, improve performance and decrease interference within sectors of a wireless network.

Overview

Exemplary embodiments described herein include systems, methods, and processing nodes for dynamically adjusting CSI reporting periodicity for a wireless device communicating with an access node within a wireless network. An exemplary method includes determining a location of the wireless device within the wireless network and identifying the determined location as an undesirable location based on antenna a sector power ratio of an antenna deployed by the access node within the wireless network. An exemplary method further includes determining an existing CSI reporting frequency for the wireless device reporting to the access node and dynamically, in response to the determination, changing the CSI reporting frequency for the wireless device to enable more frequent CSI reporting to the access node.

An exemplary system for dynamically changing CSI reporting periodicity for a wireless device communicating with an access node within a wireless network is provided. The system includes a processing node and a processor coupled to the processing node configured to perform multiple operations. The operations include determining a location of the wireless device within the wireless network and identifying the determined location as an undesirable location within the wireless network based on antenna parameters of an antenna deployed by the access node. The processor further determines an existing CSI reporting frequency for the wireless device reporting to the access node and dynamically, in response to the determination, changes the CSI reporting frequency for the wireless device to enable more frequent CSI reporting to the access node.

In a further exemplary embodiment, a processing node is configured to perform multiple operations. The operations include measuring a sector power ratio of an antenna deployed by an access node and identifying the sector power ratio as being above a predetermined threshold. The operations additionally include determining an existing CSI reporting frequency for a wireless device reporting to the access node and dynamically, in response to the determination, changing the CSI reporting frequency for a wireless device in an undesirable location to enable more frequent CSI reporting to the access node.

DETAILED DESCRIPTION

Exemplary embodiments described herein include systems, methods, and processing nodes for dynamically adjusting CSI reporting periodicity. Embodiments include networks utilizing 5G NR technology. Embodiments further encompass networks utilizing an EN-DC architecture, which allows devices to access both LTE and 5G simultaneously on the same spectrum band. Other network configurations are within scope of the disclosure.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters and wireless device location within a cell or a sector. Wireless devices may periodically send CSI reports to the access node so that the access node can respond by scheduling resources, reconfiguring MCS assignment, or taking other appropriate action to improve performance. Because certain network conditions are likely to result in poor performance, embodiments provided herein monitor these conditions and dynamically adjust reporting periodicity so that the access node can schedule resources and/or take other appropriate actions more frequently when performance is inadequate.

In exemplary embodiments, a processor or processing node associated with an access node may determine a sector power ratio of the antenna deployed by the access node serving multiple wireless devices and dynamically adjust the CSI reporting periodicity for one or more wireless devices when the sector power ratio is above a predetermined threshold. For example, if the wireless device was scheduled to send a CSI report every 30 ms, the system may adjust the CSI reporting periodicity for the wireless device to occur every 15 ms. Accordingly, a solution as described herein increases reporting frequency, thereby enabling more frequent resource scheduling or other response by the processor or processing node based on parameters included in the reporting to improve performance for one or more wireless devices.

In further exemplary embodiments, a method or system is provided that determines a location of a wireless device. The location may be determined, for example, by triangulation or by geographical coordinates. The method may further determine if the location of the wireless device is an undesirable location. For example, as will be illustrated below, undesirable locations can be determined based on the sector power ratio of an antenna communicating with the wireless device. If the sector power ratio is above a predetermined threshold, a large area may suffer from interference or poor performance. Accordingly, embodiments set forth herein identify the undesirable location based on the sector power ratio. Embodiments disclosed herein further determine an existing CSI reporting periodicity for the device in an undesirable location. If the reporting periodicity can be increased, the system dynamically instructs the wireless device in the undesirable location to increase its CSI reporting periodicity.

While the increased CSI reporting frequency can result in improved performance, the increased CSI reporting frequency also results in increased consumption of resource blocks. Therefore, in accordance with embodiments disclosed herein, methods and systems both dynamically increase and decrease reporting periodicity based on antenna parameters such as power sector ratio and wireless device location. For example, if the power sector ratio is above the predetermined threshold, but the device moves to a desirable location, embodiments of the invention decrease CSI reporting frequency. If the device moves to an undesirable location, the CSI reporting frequency is increased.

In addition to, or as an alternative to, sector power ratio, other antenna parameters can be utilized to determine whether a location is desirable or undesirable. For example, interference over a particular time period can be measured at the location. However, because sector power ratio is a static quantity that can be retrieved from a database, the ratio can readily be utilized to determine whether a location is desirable or undesirable. Once the system determines that the CSI reporting frequency can and should be changed, in embodiments disclosed herein, the system instructs the wireless device to change reporting frequency using a radio resource control (RRC) reconfiguration message.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a gigabit NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamically adjusting CSI reporting frequency may be implemented as computer-readable instructions or methods, and processing nodes on the network for executing the instructions or methods. The processing node may include a processor included in the access node or a processor included in any controller node in the wireless network that is coupled to the access node.

Figure 1:
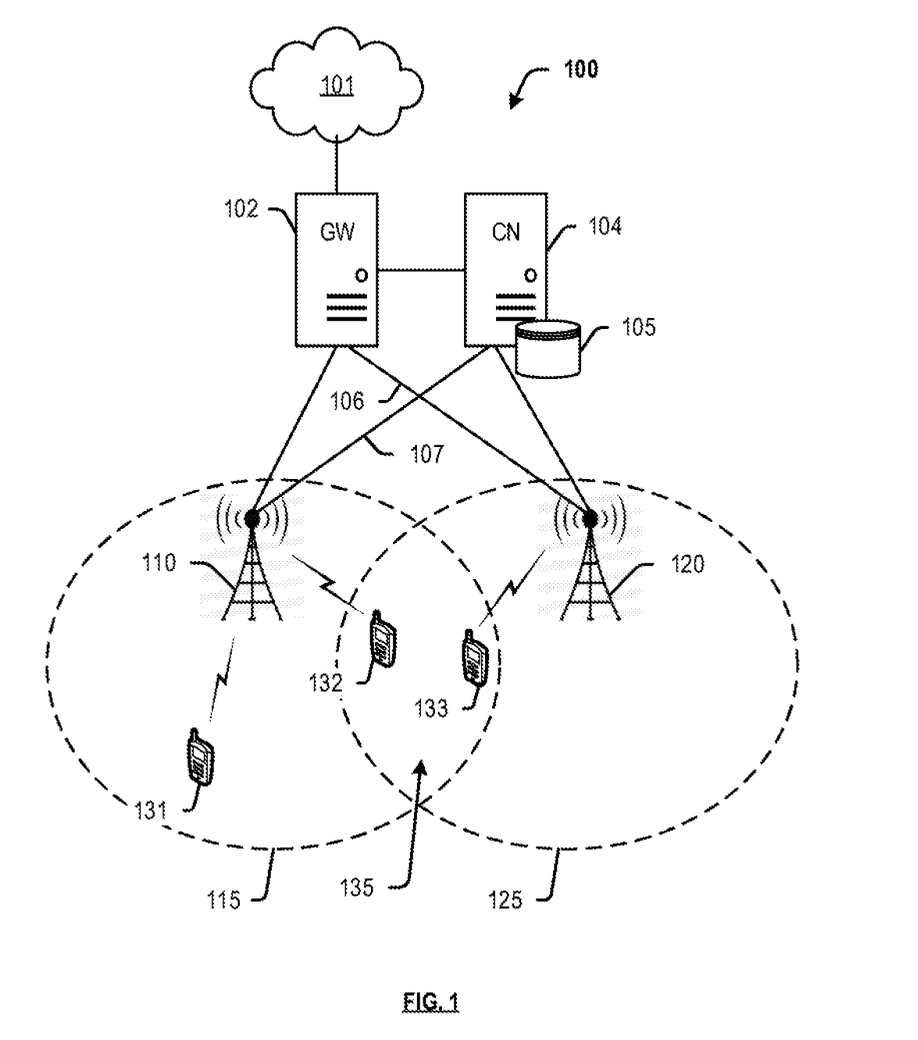
FIG. 1 depicts an exemplary system for wireless communication, in accordance with the disclosed embodiments.

FIG. 1 depicts an exemplary system 100 for use in conjunction with embodiments disclosed herein. System 100 comprises a communication network 101, gateway 102, controller node 104, access nodes 110 and 120, and wireless devices 131, 132, and 133. Access node 110 is illustrated as having a coverage area 115, and access node 120 is illustrated as having a coverage area 125. Wireless devices 131, 132 are located within coverage area 115 and access network services from access node 110. Wireless device 133 is located within coverage area 125 and accesses network services from access node 120. Further, wireless devices 132 and 133 are located within potential interference area 135 formed by an overlap of coverage areas 115, 125. For example, access nodes 110, 120 may be configured to deploy individual sectors and potential interference area 135 may comprise any overlapping coverage area of the sectors. Thus, and as further described herein, wireless devices 132 and 133, which may be in undesirable locations, may be configured by the system disclosed herein to increase frequency of CSI reporting to access nodes 110 and 120 respectively.

Further, a scheduling entity (within, for example, one or both of access nodes 110, 120, or controller node 104) may be configured to minimize interference experienced within potential interference area 135 by responding to more frequent CSI reporting by the wireless devices 132 and 133 in order to allocate resources and improve performance in the undesirable area 135. For example, in a 5G network, if antenna parameters are considered to lead to inadequate performance in the area of overlap, if the wireless devices 132 and 133 are conducting CSI reporting every 30 ms, the access nodes 110 and 120 may instruct the wireless devices 132 and 133 respectively to increase reporting periodicity to conduct CSI reporting every 15 ms. In response to the reports, the access nodes may assign resources towards the wireless devices in an appropriate manner to maximize performance. In embodiments disclosed herein, one or more of access nodes 110, 120 may comprise logic for performing operations including determining an undesirable area such as potential interference area 135 between coverage areas 115, 125 either based on the SPR or other antenna parameters such as SINR. While the potential interference area 135 is shown as an exemplary undesirable area, other types of undesirable areas are within the scope of the disclosure. For example, in addition to areas of overlapping coverage, undesirable areas may include areas with high interference or areas with a weak signal.

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HTC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as an SPR of an antenna, coordinates of potential interference area 135, positions of wireless devices 131, 132, 133, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
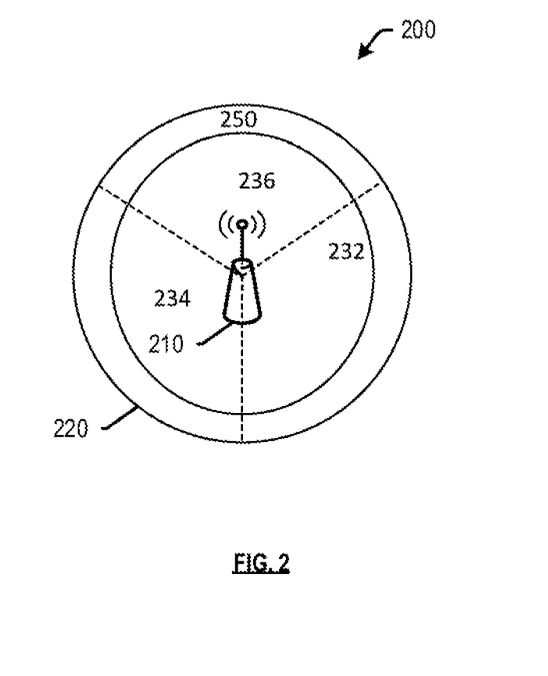
FIG. 2 illustrates an exemplary configuration of an access node coverage area.

FIG. 2 illustrates an exemplary configuration of an access node coverage area 220. An access node 210 communicates with wireless devices within a coverage area 220. The coverage area 220 may be divided into multiple sectors 232, 234, and 236. A cell edge 250 within the coverage area 220 exists in each of the sectors 232, 234, and 236. Areas within the cell edge 250 are likely to overlap with coverage areas of other access nodes. Thus, as set forth herein, devices communicating with access node 210 from the cell edge 250 may benefit from increased frequency of CSI reporting.

Figure 3:
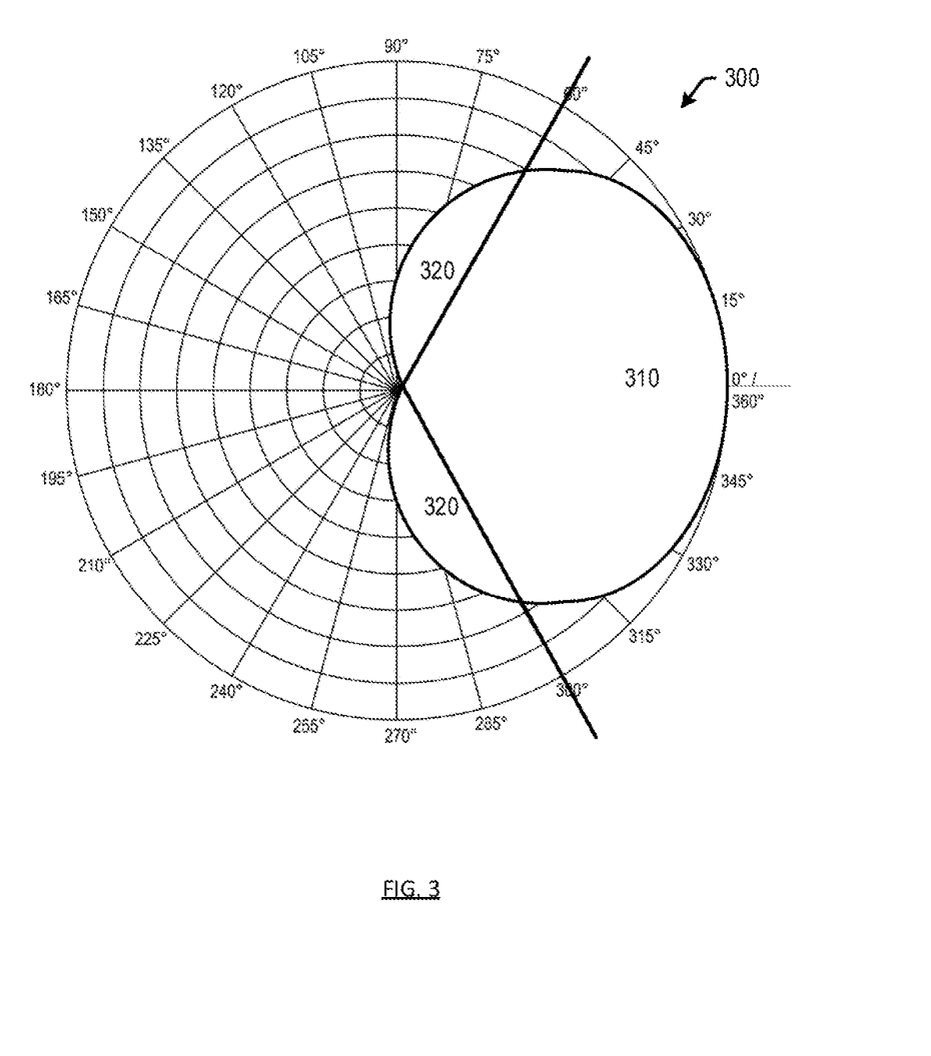
FIG. 3 is a diagram illustrating coverage areas based on antenna sector power ratio in accordance with the disclosed embodiments.

As illustrated in FIG. 3, antennas with a high SPR may result in increased areas of interference and thus, lower performance for wireless devices located in those areas. The sector power ratio may be defined as:

$$SPR\ (\%) = \frac{\sum\limits_{60}^{300} P_{Undesired}}{\sum\limits_{300}^{60} P_{Desired}} \times 100$$

Sector power ratio 300 is a measure of the ability of an antenna to minimize interference. SPR is an expression of the radio frequency (RF) power radiated outside the sector or in an undesired area 310 versus RF power radiated and retained within the sector or in a desired area 320. High performing antenna designs provide SPRs of 3% to 4% while typical designs yield an SPR of about 8%.

As illustrated in FIG. 3, the sector power ratio can be utilized to distinguish between desirable and undesirable areas as the definition is necessary for calculating the ratio. A high sector power ratio signifies a larger undesired area than a low sector power ratio. In addition to, or instead of using the sector power ratio, undesirable areas generally can be identified based on high interference (as measured by SINR or SNR), low signal strength, and overlapping sectors.

Figure 4:
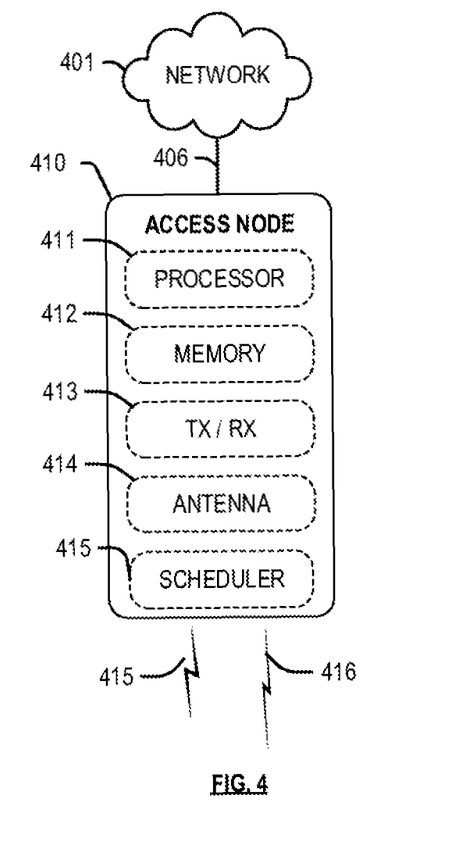
FIG. 4 depicts an access node in accordance with disclosed embodiments.

FIG. 4 depicts an exemplary access node 410. Access node 410 may comprise, for example, a macro-cell access node, such as access node 410 described with reference to FIG. 1. Access node 410 is illustrated as comprising a processor 411, memory 412, transceiver 413, and antenna 414. Processor 411 executes instructions stored on memory 412, while transceiver 413 and antenna 314 enable wireless communication with other network nodes, such as wireless devices and other nodes. For example, access node 410 may be configured to detect wireless devices located in undesirable areas and instruct the wireless devices to increase CSI reporting frequency. Scheduler 415 may be provided for scheduling resources based on received CSI reports. These features may be enabled by access node 410 comprising two co-located cells, or antenna/transceiver combinations that are mounted on the same structure. Network 401 may be similar to network 101 discussed above. Carrier aggregation mode, during which a wireless device utilizes more than one carrier, enables the wireless devices to communicate with access node 410 using a combination of resources from multiple carriers.

Further, instructions stored on memory 412 can include instructions for dynamically adjusting CSI reporting frequency, which will be further explained below with reference to FIGS. 6-8. The instructions may facilitate monitoring a level of interference and performance level of wireless devices and comparing the monitored values with stored metrics or stored predetermined thresholds. If the measured values are outside of predetermined boundaries, the instructions may dictate dynamically adjusting a CSI reporting frequency per wireless device.

Figure 5:
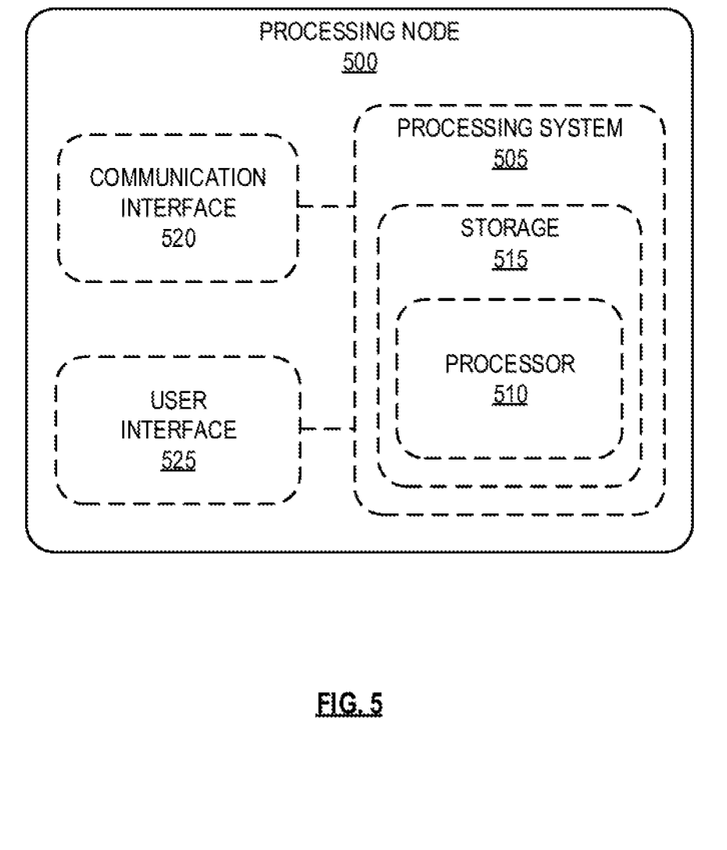
FIG. 5 depicts a processing node in accordance with the disclosed embodiments

FIG. 5 depicts an exemplary processing node 500, which may be configured to perform the methods and operations disclosed herein dynamically adjusting CSI reporting frequency in order to improve performance in a wireless network. In some embodiments, processing node 500 may be included in an access node, such as access node 110 or 410. In further embodiments, processing node 500 may be included in controller node 104 and may be configured for controlling the access nodes.

Processing node 500 may be configured for performing interference mitigation and performance improvement in the network as set forth above. The adjustment of CSI reporting frequency may be performed dynamically in real time based on a determination of undesirable location in a sector or in a network, such as the network 101. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc.

The disclosed methods for dynamically adjusting CSI reporting frequency are discussed further below. FIG. 6 illustrates an exemplary method 600 for dynamically adjusting CSI reporting frequency for a wireless device in a network. Method 600 may be performed by any suitable processor discussed herein, for example, a processor included in access node 110 or 410, processor 510 included in processing node 500, or a processor included in controller node 104. For discussion purposes, as an example, method 600 is described as being performed by a processor included in access node 110.

Method 600 starts in step 610 and the access node may monitor a wireless device to determine that is in an undesirable location. In order to make this determination, the access node may determine a location of the wireless device through one of various methods including triangulation, longitude and latitude, or GPS coordinates. The access node may be aware of undesirable locations based on measured interference parameters such as signal to noise ratio (SNR). The interference level may be measured, for example, within a sector of a wireless network. The undesirable locations may further be detectable based on the SPR. The SPR value for the antenna is preferably stored in a database accessible to the access node. Higher SPR values indicate a larger range of undesirable locations and the undesirable locations can be identified based on the SPR values. The measuring of interference levels and location of the wireless device may be performed sequentially in any order or may occur simultaneously or continuously.

In step 610, the method includes determining an existing CSI reporting frequency. The existing reporting frequency may be stored in a database or table at the access node. In step 630, the method determines if the existing CSI reporting frequency can be increased. Minimum and maximum reporting frequencies may for example, be set at the access node and stored in a database. To determine if the CSI reporting frequency can be increased, the access node can compare the existing frequency with the maximum frequency stored in the database. If the CSI reporting frequency can be increased in step 630, the access node increases the reporting frequency in step 640. The increase in reporting frequency of the wireless device in the undesirable location enables more frequent reallocation of resources in order to enhance performance of the wireless device. In order to increase the reporting frequency, the access node may instruct the wireless device in the undesirable location to increase its CSI reporting frequency through an RRC reconfiguration message or other message directed specifically to the wireless device. The access node continues to monitor the locations of wireless devices in the sector in step 610.

Figure 6:
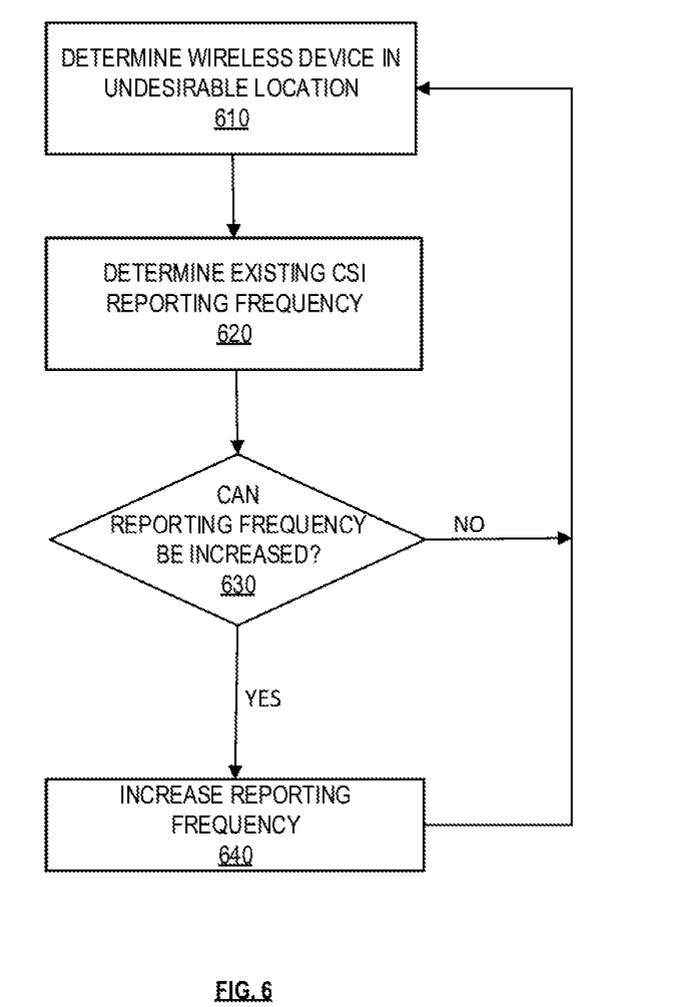
FIG. 6 depicts an exemplary method for dynamically adjusting CSI reporting periodicity.
Figure 7:
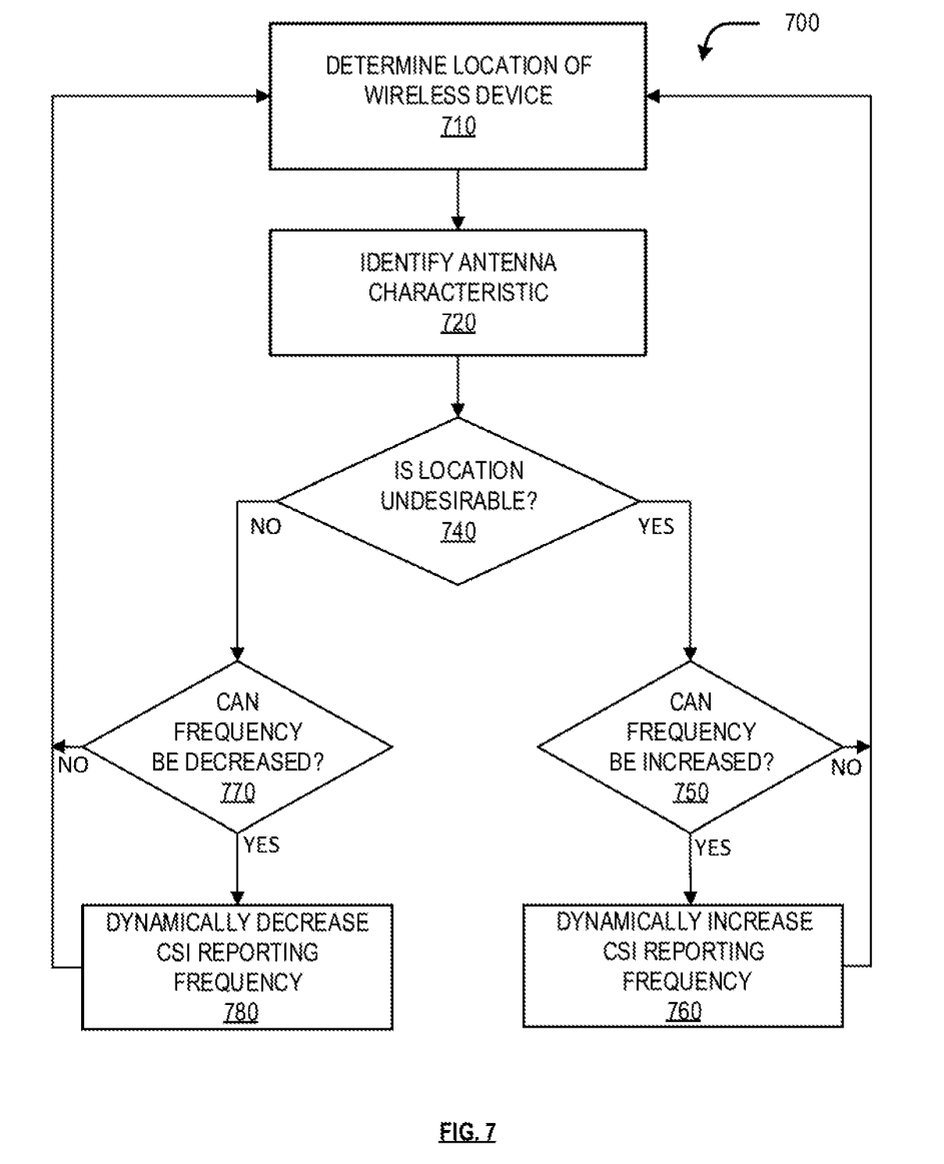
FIG. 7 depicts another exemplary method for dynamically adjusting CSI reporting frequency.

While the method of FIG. 6 aims to dynamically increase CSI reporting frequency for a wireless device in an undesirable area of a network or a sector, the method of FIG. 7 illustrates the process of dynamically adjusting the CSI reporting frequency in both directions. Because increased reporting frequency consumes resources it may be desirable to lower the frequency of reporting when a wireless device moves to a desirable location and is no longer experiencing a high level of interference. Dynamically decreasing the reporting frequency will allow effective and efficient distribution of network resources when a high level of interference is not present.

Method 700 may be performed by any suitable processor discussed herein, for example, a processor included in access node 110 or 410, processor 510 included in processing node 500, or a processor included in controller node 104. For discussion purposes, as an example, method 700 is described as being performed by a processor included in access node 110. The method 700 begins in step 710 as the location of a wireless device is determined based on such methods as triangulation or geographical coordinates or other suitable method.

In step 720, the method identifies an antenna characteristic, such as SPR or other signal characteristics, which contributes to the determination of whether the current location of the wireless device is undesirable in step 740. In step 740, the system determines if the device is in a desirable or undesirable location. As set forth above, undesirable locations include locations with high interference, high SPR, low signal strength, low SNR, or other locations where poor performance characteristics are expected. Desirable locations may include locations with high signal strength, low interference, low SPR, high SNR, or other indicators that lead to satisfactory network performance.

If the device is in a desirable location in step 740, the system determines if the frequency of CSI reporting can be decreased based on the existing reporting frequency and pre-set minimum and maximum reporting intervals. The decreasing of reporting frequency when the frequency is unnecessary will allow more efficient distribution of resources. If the frequency cannot be decreased, the method continues to monitor device locations in step 710. However, if the frequency can be decreased in step 770, the system dynamically decreases the frequency of CSI reporting through instruction to the wireless device in step 780.

Alternatively, if the device is in an undesirable location in step 740, the system determines if the frequency of CSI reporting can be increased in step 750. The determination can be made, for example, by identifying the current reporting frequency for the wireless device and determine if the frequency has reached a pre-set maximum by comparison of the two values. If the frequency can be increased at step 750, the system dynamically increases CSI reporting frequency in step 760. If the CSI frequency cannot be increased in step 750, the system continues to monitor locations of wireless devices in step 710.

Figure 8:
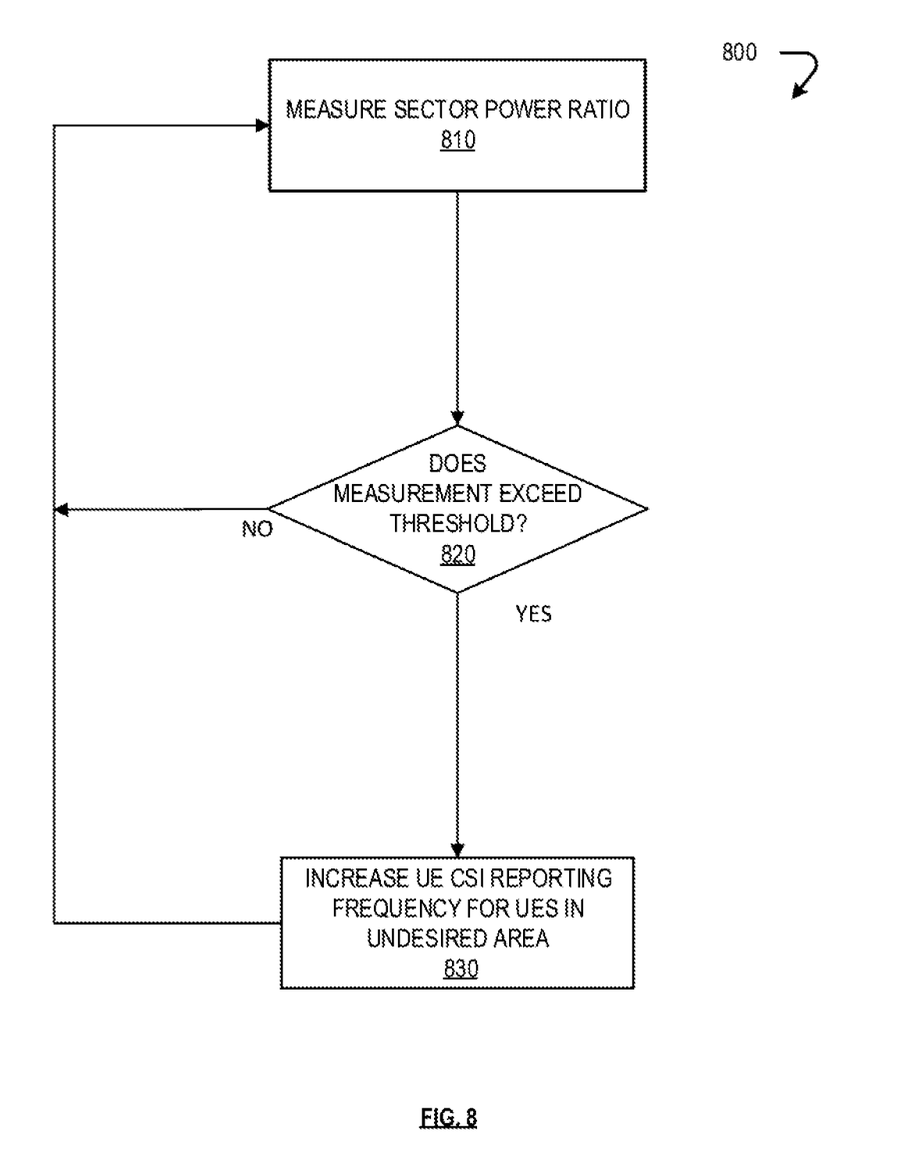
FIG. 8 illustrates a further exemplary method for dynamically adjusting CSI reporting frequency.

FIG. 8 depicts an additional exemplary method 800 for dynamically adjusting CSI reporting frequency. Method 800 may be performed by any suitable processor discussed herein, for example, a processor included in access node 110 or 410, processor 510 included in processing node 500, or a processor included in controller node 104. For discussion purposes, as an example, method 800 is described as being performed by a processor included in access node 110.

In method 800, the processor measures or retrieves sector power ratio for an antenna communicating with a wireless device. In step 820, the system determines if the SPR exceeds a predetermined threshold. If the SPR exceeds the predetermined threshold, then the access node increases CSI reporting frequency for the wireless device in an undesired area in step 830. As set forth above, SPR is a measure of the ability of an antenna to minimize interference and is the ratio of the signal in an undesired area to the signal strength in desired areas. Thus, the desired and undesired areas are defined by the SPR. High performing antenna designs provide SPRs of 3% to 4% while typical designs yield an SPR of about 8%. A threshold may be set and stored by the system. For example, the threshold may be set at 9%. Other thresholds are within scope of the disclosure.

In some embodiments, methods 600, 700, and 800 may include additional steps or operations. Furthermore, the methods may include steps shown in each of the other methods. As one of ordinary skill in the art would understand, the methods 600, 700, and 800 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dynamically changing channel state information (CSI) reporting periodicity for a wireless device communicating with an access node within a wireless network, the method comprising:
   identifying a sector power ratio of an antenna deployed by the access node as exceeding a predetermined threshold;
   determining a location of the wireless device within the wireless network;
   identifying the determined location as an undesirable location based on the sector power ratio of the antenna deployed by the access node within the wireless network;
   determining an existing CSI reporting frequency for the wireless device reporting to the access node can be increased; and
   dynamically, in response to the determination that the CSI reporting frequency can be increased and the identification of the determined location as an undesirable location, changing the CSI reporting frequency for the wireless device to enable more frequent CSI reporting to the access node.

2. The method of claim 1, further comprising identifying the location of the wireless device based on triangulation.

3. The method of claim 1, further comprising identifying the location of the wireless device based longitude and latitude coordinates.

4. The method of claim 1, further comprising instructing the wireless device to change CSI reporting frequency.

5. The method of claim 4, further comprising sending instructions within an RRC reconfiguration message to the wireless device.

6. The method of claim 1, further comprising identifying the determined location as an undesirable location by extracting the sector power ratio from a database.

7. The method of claim 1, further comprising dynamically assigning a modulation and coding scheme (MCS) based on the CSI reporting.

8. A system for dynamically changing channel state information (CSI) reporting periodicity for a wireless device communicating with an access node within a wireless network, the system comprising:
- a processing node; and
- a processor coupled to the processing node configured to perform operations comprising:
  - identifying a sector power ratio of an antenna deployed by the access node as exceeding a predetermined threshold;
  - determining a location of the wireless device within the wireless network;
  - identifying the determined location as an undesirable location within the wireless network based on antenna parameters of the antenna deployed by the access node;
  - determining an existing CSI reporting frequency for the wireless device reporting to the access node can be increased; and
  - dynamically, in response to the determination that the CSI reporting frequency can be increased and the identification of the determined location as an undesirable location, changing the CSI reporting frequency for the wireless device to enable more frequent CSI reporting to the access node.

9. The system of claim 8, wherein the operations further comprise identifying the determined location as undesirable based on a sector power ratio of the antenna deployed by the access node.

10. The system of claim 8, wherein the operations further comprise identifying the determined location as undesirable based on interference at the location measured over a time period.

11. The system of claim 8, wherein the operations further comprise identifying the location of the wireless device based on triangulation.

12. The system of claim 8, wherein the operations further comprise identifying the location of the wireless device based longitude and latitude coordinates.

13. The system of claim 8, further comprising instructing the wireless device to change CSI reporting frequency.

14. The system of claim 13, further comprising sending instructions within an RRC reconfiguration message to the wireless device.

15. A processing node configured to perform operations comprising:
- measuring a sector power ratio of an antenna deployed by an access node;
- identifying the sector power ratio as exceeding a predetermined threshold;
- determining a location of a wireless device within the wireless network;
- identifying the determined location as an undesirable location within the wireless network;
- determining an existing CSI reporting frequency for the wireless device reporting to the access node;
- determining the existing CSI reporting frequency can be increased; and
- dynamically, in response to the determination that the CSI reporting frequency can be increased and the identification of the determined location as an undesirable location, changing the CSI reporting frequency for the wireless device to enable more frequent CSI reporting to the access node.

16. The processing node of claim 15, further comprising identifying a location of the wireless device as undesirable based on the sector power ratio of the antenna deployed by the access node.

17. The processing node of claim 15, further comprising identifying a location of the wireless device as undesirable based on interference within a sector of the wireless network measured over a time period.

18. The processing node of claim 15, further comprising identifying a location of the wireless device based on triangulation.

19. The processing node of claim 15, further comprising identifying a location of the wireless device based longitude and latitude coordinates.

20. The processing node of claim 15, further comprising instructing the wireless device to change CSI reporting frequency.

* * * * *